US012607510B2

(12) United States Patent
Ueno et al.

(10) Patent No.: US 12,607,510 B2
(45) Date of Patent: Apr. 21, 2026

(54) OPTICAL SPECTRUM ANALYZER

(71) Applicant: ANRITSU CORPORATION,
Kanagawa (JP)

(72) Inventors: Maki Ueno, Kanagawa (JP); **Shinji
Morimoto, Kanagawa (JP); Hajime
Yoshino**, Kanagawa (JP)

(73) Assignee: ANRITSU CORPORATION,
Kanagawa (JP)

( * ) Notice: Subject to any disclaimer, the term of this
patent is extended or adjusted under 35
U.S.C. 154(b) by 100 days.

(21) Appl. No.: 18/626,486

(22) Filed: Apr. 4, 2024

(65) Prior Publication Data

US 2024/0344885 A1        Oct. 17, 2024

(30) Foreign Application Priority Data

Apr. 12, 2023        (JP) ................................. 2023-065062

(51) Int. Cl.
*G01J 3/28*        (2006.01)
*G01J 3/18*        (2006.01)
(52) U.S. Cl.
CPC .. *G01J 3/28* (2013.01); *G01J 3/18* (2013.01)
(58) Field of Classification Search
CPC ...... G01J 3/28; G01J 3/18; G01J 3/027; G01J
3/2803; G01J 3/0205; G01J 3/06; G01J
11/00; G01J 2003/064
See application file for complete search history.

(56) References Cited

U.S. PATENT DOCUMENTS

2004/0246477 A1*  12/2004  Moon .............. H04B 10/07955
                                                               356/300
2007/0177141 A1*   8/2007  Ohishi .................. G01J 3/4338
                                                               356/328

FOREIGN PATENT DOCUMENTS

JP            3274035 B2      4/2002
JP        2022-152858 A      10/2022

* cited by examiner

*Primary Examiner* — Seung C Sohn
(74) *Attorney, Agent, or Firm* — McDonald Hopkins LLC

(57)        ABSTRACT

Provided is an optical spectrum analyzer capable of stably
measuring a spectrum of pulsed light while suppressing a
decrease in a sweep speed. An A/D conversion unit 17 has
a plurality of inputs to which the outputs of a plurality of
amplifiers Amp21 to Amp2*m* are connected. A control unit
12 selects one of the plurality of amplifiers Amp21 to
Amp2*m* whose output is not saturated based on optical
power signals amplified by the plurality of amplifiers
Amp21 to Amp2*m*. The control unit 12 sets an average value
of the optical power signals sampled by the A/D conversion
unit 17 and amplified by the selected one of the amplifiers
Amp21 to Amp2*m* as the optical power signal of the next
wavelength, while sweeping from the previous wavelength
to the next wavelength is performed.

2 Claims, 7 Drawing Sheets

OPTICAL SPECTRUM ANALYZER

TECHNICAL FIELD

The present invention relates to an optical spectrum analyzer.

BACKGROUND ART

In the related art, an optical spectrum analyzer as disclosed in, for example, Patent Document 1 is used to measure a spectrum of light to be measured, which is a measurement target (optical power for each wavelength included in the light to be measured). The optical spectrum analyzer of Patent Document 1 makes the light to be measured incident on a diffraction grating to emit diffracted light obtained by dispersing and spectrally separating the light to be measured, rotates the diffraction grating, and causes a light receiving section to receive the diffracted light swept in a wavelength.

In recent years, in order to reduce heat generation of a light source, measurement using pulsed light as the light to be measured is required. Therefore, an optical spectrum analyzer is proposed that performs A/D conversion of an optical spectrum signal (electric signal) converted by a light receiving section at a timing at which the pulsed light is emitted (Patent Document 2).

However, in the optical spectrum analyzer in the related art, there are problems in that, since it is necessary to synchronize a period of the pulsed light with sampling of an A/D conversion unit, a measurement system becomes complicated, and since a sweep speed is limited by a frequency of the pulsed light, the sweep itself becomes slow.

RELATED ART DOCUMENT

Patent Document

[Patent Document 1] Japanese Patent No. 3274035
[Patent Document 2] JP-A-2022-152858

DISCLOSURE OF THE INVENTION

Problem that the Invention is to Solve

The present invention has been made in view of the above-described circumstances, and an object of the present invention is to provide an optical spectrum analyzer capable of stably measuring a spectrum of pulsed light while suppressing a decrease in a sweep speed.

Means for Solving the Problem

In order to achieve the above-mentioned object, the optical spectrum analyzer according to the present invention is characterized by the following [1] and [2].

[1]

An optical spectrum analyzer (1) including: a spectral section (4) that emits diffracted light obtained by spectrally separating a wavelength included in pulsed light to be measured in a direction corresponding to the wavelength; a light receiving section (8) that receives the diffracted light emitted from the spectral section (4) and converts the diffracted light into an electric signal; a sweep section (9) that causes the light receiving section (8) to receive the diffracted light swept in a wavelength; an amplification unit (16) that amplifies the electric signal converted by the light receiving section (8) and outputs the amplified electric signal as an optical power signal; an A/D conversion unit (17) that performs A/D conversion of the optical power signal output by the amplification unit (16); and a control unit (12) that obtains optical power for each wavelength included in the pulsed light based on the optical power signal sampled and converted into a digital value by the A/D conversion unit (17) during wavelength sweeping, in which the amplification unit (16) has a plurality of amplifiers (Amp21 to Amp2m) having gains different from each other, the A/D conversion unit (17) has a plurality of A/D converters to which outputs of the plurality of amplifiers (Amp21 to Amp2m) are respectively connected, and the control unit (12) selects one of the amplifiers (Amp21 to Amp2m) whose output is not saturated based on the optical power signals amplified by the plurality of amplifiers (Amp21 to Amp2m) and converted into the digital values by the plurality of A/D converters, and obtains the optical power based on the digital value of the optical power signal sampled by the A/D conversion unit (17) and output from the selected one of the amplifiers (Amp21 to Amp2m).

[2]

The optical spectrum analyzer according to [1], in which the A/D conversion unit (17) samples the optical power signal in a sampling time shorter than a period of the pulsed light.

According to the optical spectrum analyzer having the configuration of [1], there is a high possibility that the sampled optical power signal includes an optical power signal sampled at a peak timing while sweeping from the previous wavelength to the next wavelength is performed. Moreover, a period in which the amplifier is switched by the switch is eliminated and a period in which sampling can be performed while sweeping from the previous wavelength to the next wavelength is performed can be lengthened, so that a possibility of performing sampling at the peak timing of the optical power signal can be further increased. As a result, a spectrum of the pulsed light can be stably measured while suppressing a decrease in a sweep speed.

According to the optical spectrum analyzer having the configuration of [2], it is possible to further increase the possibility of performing sampling at the peak timing of the optical power signal.

Advantage of the Invention

According to the present invention, it is possible to provide an optical spectrum analyzer capable of stably measuring a spectrum of pulsed light while suppressing a decrease in a sweep speed.

The present invention has been briefly described above. Further, the details of the present invention will be further clarified by reading through a mode for carrying out the invention described below (hereinafter referred to as an "embodiment") with reference to the accompanying drawings.

BEST MODE FOR CARRYING OUT THE
INVENTION

Specific embodiments of the present invention will be described below with reference to the respective figures.

Figure 1:
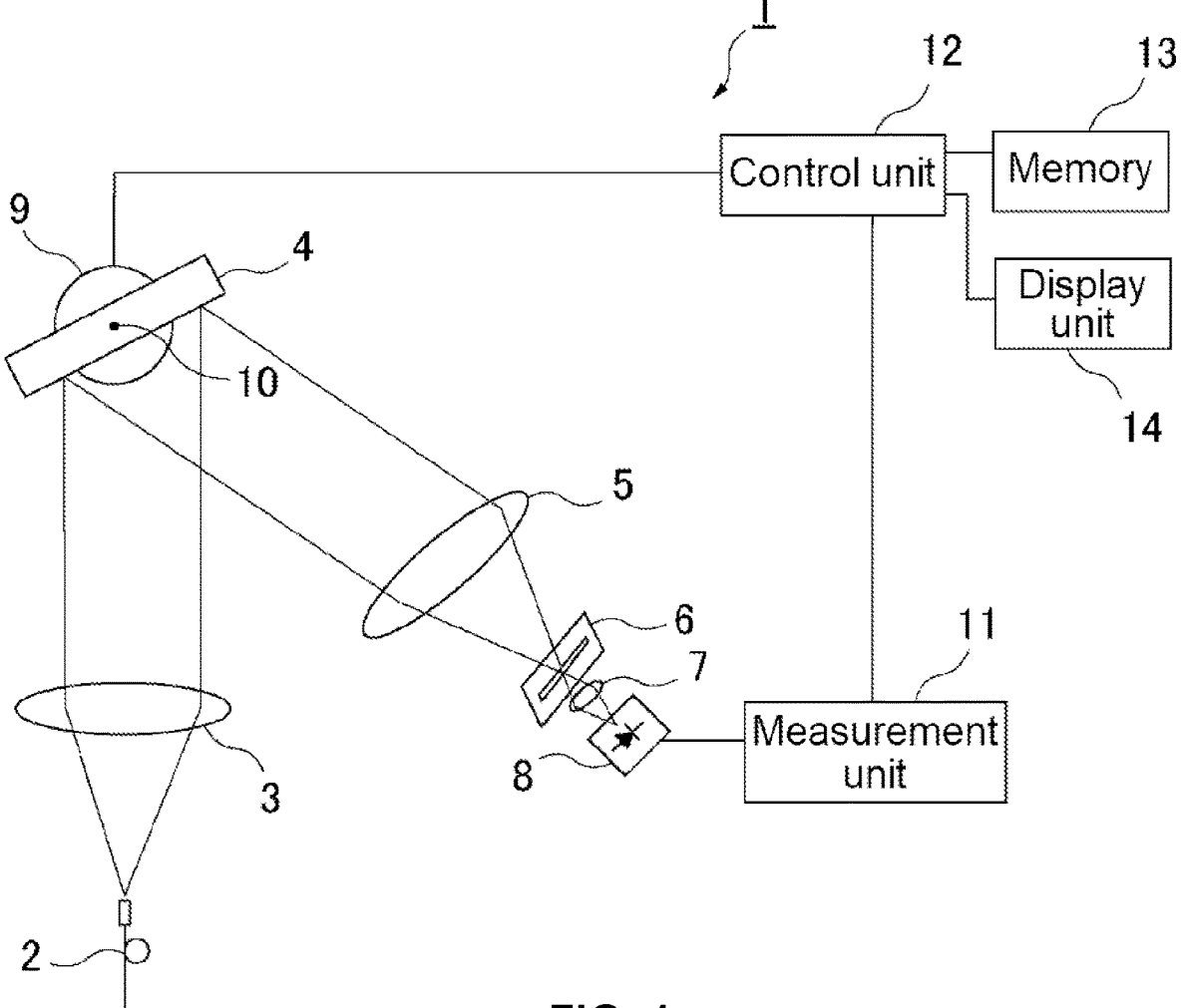
FIG. 1 is a configuration diagram showing an embodiment of an optical spectrum analyzer of the present invention.

As shown in FIG. 1, an optical spectrum analyzer 1 is a device that measures and displays optical power for each wavelength included in pulsed light.

The optical spectrum analyzer 1 includes an incident section 2, a collimator 3, a diffraction grating 4 (=spectral section), a condenser 5, a slit 6, a condenser 7, a light receiving section 8, and a motor 9 (=sweep section). The incident section 2 is formed of, for example, an optical fiber, and emits pulsed light to be measured. The pulsed light is incident into the collimator 3. The collimator 3 converts the pulsed light from the incident section 2 into parallel light. The parallel light emitted from the collimator 3 is incident into the diffraction grating 4.

The diffraction grating 4 disperses and spectrally separates the parallel light emitted from the collimator 3. In the present embodiment, the diffraction grating 4 is rotatable by the motor 9 about a rotation axis 10 perpendicular to a plane of the drawing. A plurality of fine groove portions (not shown) are formed on a surface of the diffraction grating 4 in a direction orthogonal to the rotation axis 10 in a row along a rotation axis direction. When the parallel light from the collimator 3 is incident into the diffraction grating 4, the diffraction grating 4 emits the diffracted light that has been dispersed and spectrally separated. The diffracted light is light in which a wavelength included in the pulsed light is spectrally separated in a direction corresponding to the wavelength by a diffraction phenomenon. The diffracted light is incident into the condenser 5. The motor 9 rotates the diffraction grating 4 to cause the light receiving section 8 to be described below to receive the diffracted light swept in a wavelength. That is, the light receiving section 8 receives the diffracted light whose wavelength continuously changes in association with the rotation of the diffraction grating 4.

The condenser 5 condenses the diffracted light onto a position where the slit 6 to be described below is disposed. The diffracted light that has passed through the slit 6 is incident into the condenser 7. The condenser 7 condenses the incident diffracted light onto a position where the light receiving section 8 is disposed. The light receiving section 8 is formed of a photodiode, and a current flows therethrough in accordance with the optical power of the incident diffracted light.

Figure 2:
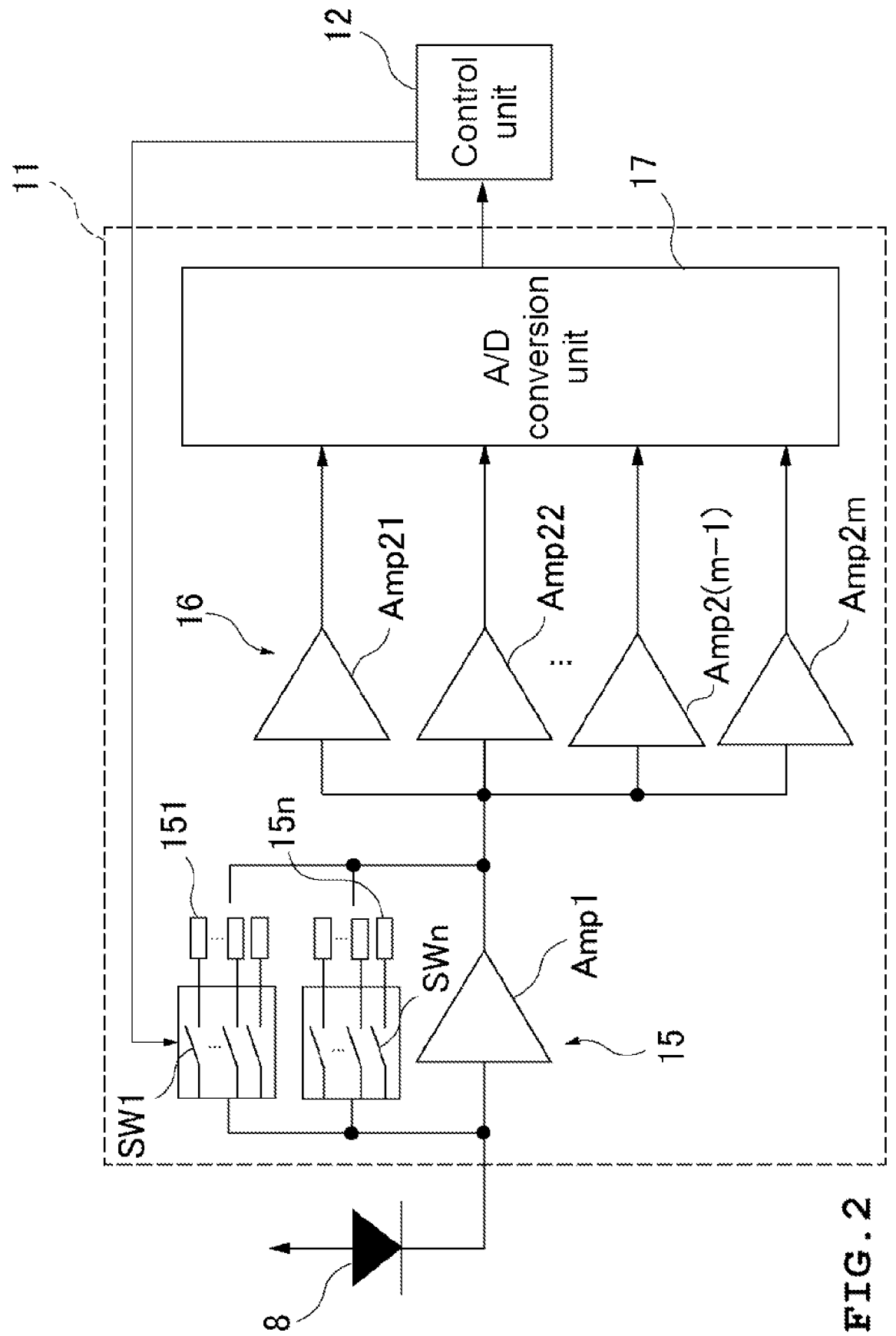
FIG. 2 is a circuit diagram showing details of a measurement unit shown in FIG. 1.

The optical spectrum analyzer 1 further includes a measurement unit 11, a control unit 12, a memory 13, and a display unit 14. As shown in FIG. 2, the measurement unit 11 has a current-voltage conversion unit 15, an amplification unit 16, and an A/D conversion unit 17. The current-voltage conversion unit 15 converts the current flowing through the light receiving section 8 into a voltage and outputs the voltage as an optical power signal (=electric signal). The current-voltage conversion unit 15 also functions as a low-pass filter that removes high-frequency noise of the optical power signal. The current-voltage conversion unit 15 is provided such that a passband width (video band width (VBW) and a gain of the low-pass filter that can be changed, and the VBW and the gain are controlled by the control unit 12 to be described below.

Next, a detailed configuration of the current-voltage conversion unit 15 will be described. The current-voltage conversion unit 15 has an amplifier Amp1, a plurality of elements 151 to 15*n* (n is an integer) connected between an input and an output of the amplifier Amp1, and switches SW1 to SWn that turn on and off the connection between the plurality of elements 151 to 15*n* and the amplifier Amp1. The elements 151 to 15*n* are formed of a capacitor or a resistor. By controlling on/off of the switches SW1 to SWn and switching the elements 151 to 15*n* connected to the amplifier Amp1, the VBW and the gain of the current-voltage conversion unit 15 can be changed.

The amplification unit 16 amplifies the optical power signal output from the current-voltage conversion unit 15. In the present embodiment, the amplification unit 16 has a plurality of amplifiers Amp21 to Amp2*m* (m is an integer) having gains different from each other. Outputs of the plurality of amplifiers Amp21 to Amp2*m* are connected to the A/D conversion unit 17. The analog optical power signal from which the high-frequency noise is removed by the current-voltage conversion unit 15 and which is amplified by the amplification unit 16 is input to the A/D conversion unit 17.

The A/D conversion unit 17 has a plurality of A/D converters, and has an input to each of the A/D converters. The outputs of the plurality of amplifiers Amp21 to Amp2*m* are connected to the inputs of the plurality of A/D converters, respectively. The A/D conversion unit 17 samples the analog optical power signals input to the inputs of the plurality of A/D converters and performs A/D conversion, and outputs digital values of signal levels of the optical power signals to the control unit 12.

Figure 3:
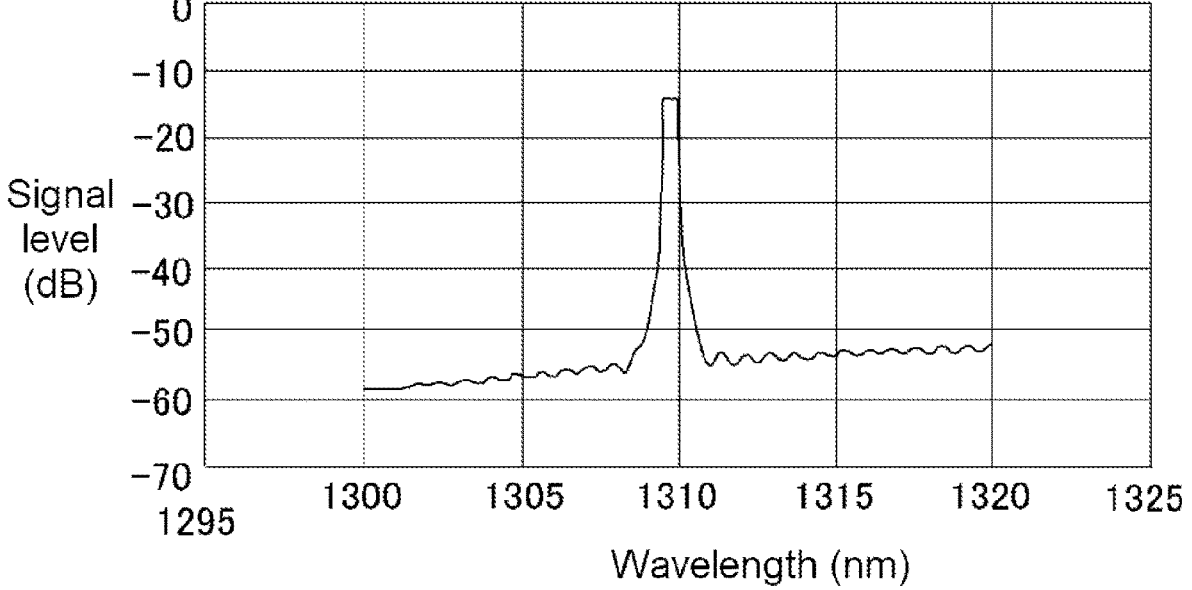
FIG. 3 is an example of a graph displayed on a display unit shown in FIG. 1.

The control unit 12 includes, for example, a field programmable gate array (FPGA) or a digital signal processor (DSP), and controls the entire optical spectrum analyzer 1. The control unit 12 rotates the motor 9 at a constant speed, and causes the light receiving section 8 to receive the diffracted light swept in a wavelength. The control unit 12 acquires the optical power signal for each discrete wavelength. The control unit 12 connects the optical power signals acquired for the respective discrete wavelengths to display a signal level (dB) of the optical power signal for each continuous wavelength as shown in FIG. 3 on the display unit 14. The memory 13 stores a digital value of the optical power signal and the like.

Figure 4:
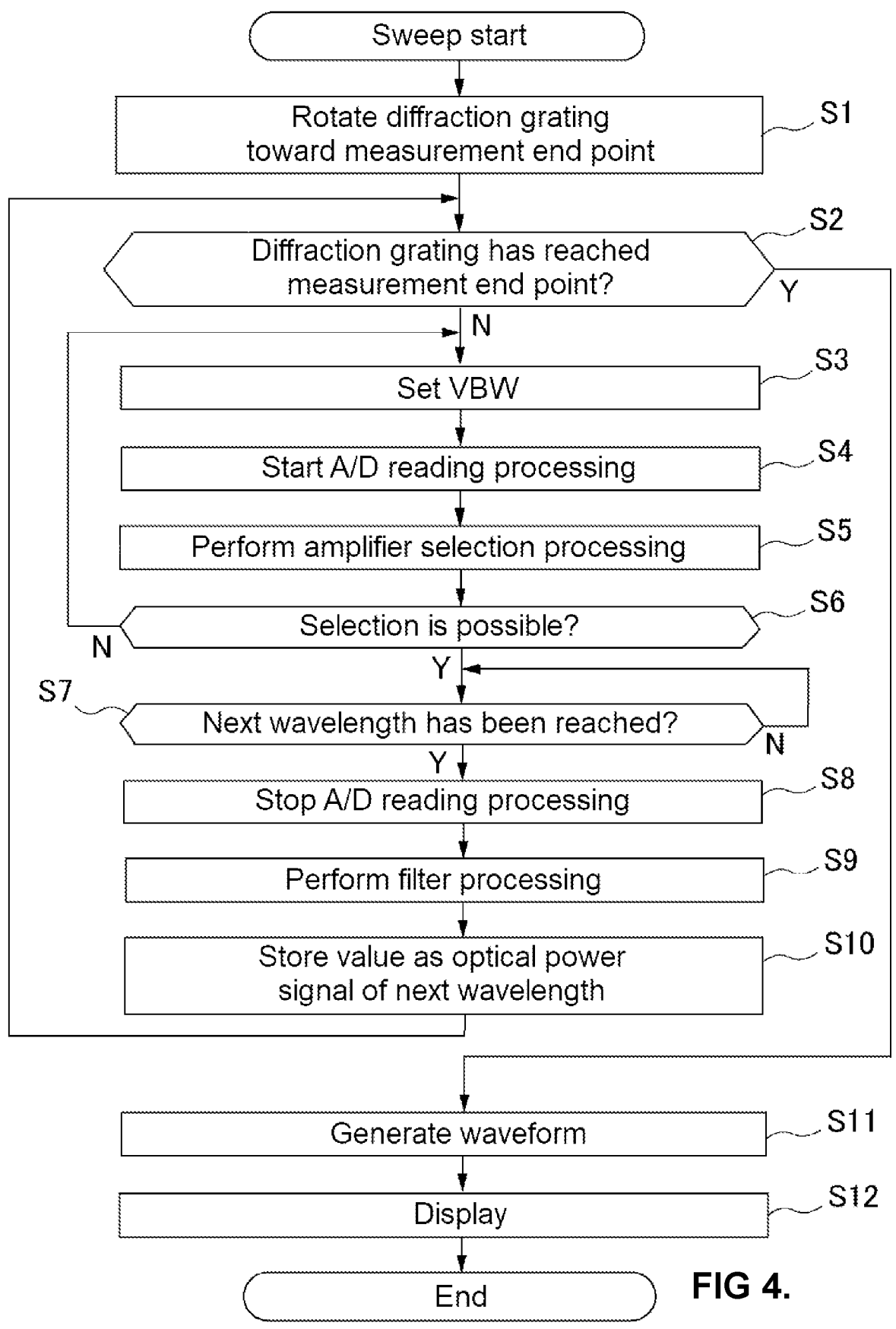
FIG. 4 is a flowchart showing a processing procedure of a control unit shown in FIG. 1.

Next, the operation of the optical spectrum analyzer 1 described above will be described below with reference to a flowchart of FIG. 4. The control unit 12 starts sweeping in response to an operation of an operation unit (not shown). At this time, it is assumed that the diffraction grating 4 is located at a measurement start point. The control unit 12 controls the motor 9 to rotate the diffraction grating 4 at a constant speed toward a measurement end point (S1).

Next, the control unit 12 determines whether or not the diffraction grating 4 has reached the measurement end point from an output of an encoder (not shown) attached to the motor 9 (S2). When the diffraction grating 4 has not reached the measurement end point (N in S2), the control unit 12 controls on/off of the switches SW1 to SWn to set the VBW of the current-voltage conversion unit 15 (S3).

An example of the VBW setting executed by the control unit 12 in S3 will be described. First, a relationship between the signal level of the optical power signal and the VBW will be described. The lower the signal level of the optical power signal, the smaller the signal-to-noise ratio (SN ratio), and the more susceptible the optical power signal is to noise. On the other hand, the smaller (narrower) the bandwidth of the VBW, the wider the bandwidth in which the high-frequency noise can be cut, so that the influence of the high-frequency noise can be reduced. However, when the optical power signal is a pulse signal, the lower the bandwidth of the VBW, the longer the rise time and the fall time of the pulse output from the current-voltage conversion unit 15. For this reason, in a case where the VBW is lowered when the signal level of the optical power signal is high, it takes time for the output of the current-voltage conversion unit 15 to reach a high signal level, resulting in a longer sweep time. On the contrary, in a case where the VBW is increased when the signal level of the optical power signal is low, the sweep time is shortened, but the influence of high-frequency noise cannot be reduced.

Therefore, the control unit 12 sets the VBW to be low according to the low signal level of the optical power signal. Accordingly, it is possible to suppress an increase in the sweep time while reducing the influence of the high-frequency noise. When the VBW is set, the gain is also set.

Next, the control unit 12 starts A/D reading processing of sequentially reading the digital values of the optical power signals sampled at a sampling period shorter than the period of the pulsed light by the A/D conversion unit 17, and storing the digital values in the memory 13 (S4). In S4, the control unit 12 reads the digital values of the optical power signals amplified by all the amplifiers Amp21 to Amp2m and stores the digital values in the memory 13. Thereafter, the control unit 12 performs amplifier selection processing of selecting one of the amplifiers Amp21 to Amp2m whose output is not saturated based on the read digital values of the optical power signals (S5).

Figure 5:
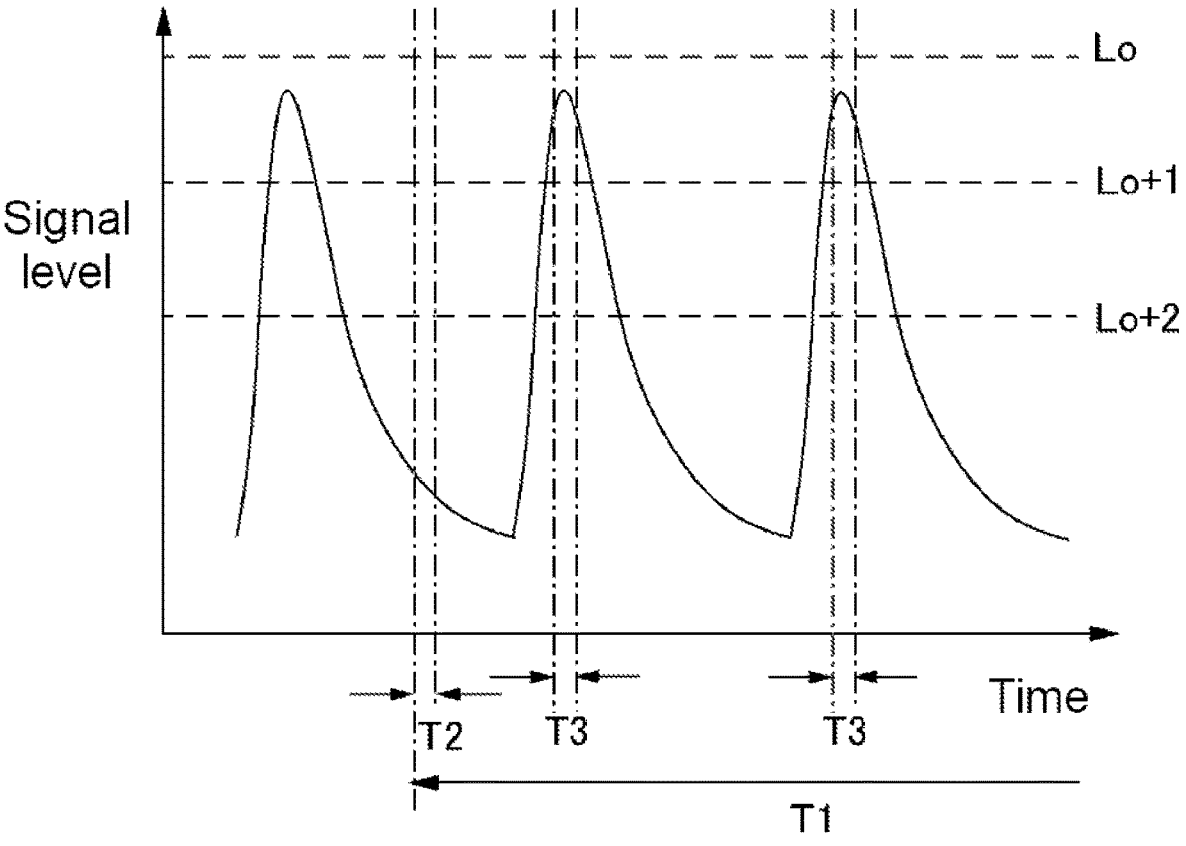
FIG. 5 is a time chart of an optical power signal output from a current-voltage conversion unit of FIG. 2.

Details of the amplifier selection processing will be described with reference to FIG. 5. FIG. 5 shows the optical power signal output from the current-voltage conversion unit 15. Saturation levels Lo (o is any integer of 1 to m) to Lo+2 in FIG. 5 indicate input signal levels at which outputs of the amplifiers Amp2o to Amp2o+2 are saturated. Since the optical power signal does not exceed the saturation level Lo of the amplifier Amp2o, the maximum value (=saturation value) is not included in the digital value of the optical power signal amplified by the amplifier Amp2o, and the peak of the optical power signal can be captured.

Since the optical power signal exceeds the saturation levels Lo+1 and Lo+2 of the amplifiers Amp2o+1 and Amp2o+2, the maximum value is included in the digital values of the optical power signals amplified by the amplifiers Amp2o+1 and Amp2o+2, and the peak of the optical power signal cannot be captured. In the amplifier selection processing, the control unit 12 selects one of the amplifiers Amp21 to Amp2m in which the maximum value of the digital value is not included.

When the outputs of all the amplifiers Amp21 to Amp2m are saturated and the amplifiers Amp21 to Amp2m cannot be selected (N in S6), the control unit 12 stops the A/D reading processing, returns to S3 again, and changes the gain by changing the VBW of the current-voltage conversion unit 15. When the amplifiers Amp21 to Amp2m can be selected (Y in S6), the control unit 12 determines whether or not a measurement interval per point corresponding to the minimum value of the VBW has elapsed and the next wavelength has been reached (S7). When the next wavelength is reached (Y in S7), the control unit 12 stops the A/D reading processing and sets the wavelength corresponding to the output of the encoder at this time as the next wavelength reached in S7 (S8). Next, the control unit 12 performs filter processing (S9).

The period from starting the A/D reading processing in S4 to stopping the A/D reading processing in S8 is included in the period during which the sweeping from the previous wavelength to the next wavelength is performed. In the filter processing, the control unit 12 obtains an average value of the digital values of the optical power signals amplified by the amplifiers Amp21 to Amp2m selected by the amplifier selection processing during this period (S9). The control unit 12 stores the average value obtained by the filter processing in the memory 13 as the optical power signal of the next wavelength set in S8 (S10), and then returns to S2.

When the control unit 12 returns to S2 and the diffraction grating 4 reaches the measurement end point (Y in S2), the digital value of the optical power signal for each discrete wavelength between the measurement start point and the measurement end point is stored in the memory 13. The control unit 12 connects the optical power signals for the respective discrete wavelengths to generate a display waveform indicating the optical power for each continuous wavelength as shown in FIG. 3, and displays the display waveform on the display unit 14 (S11, S12) to end the process.

Next, the effects of the optical spectrum analyzer 1 of the present embodiment described above will be described. The optical spectrum analyzer in the related art samples the optical power signal and reads the digital value each time the next wavelength is reached while sweeping from the measurement start point to the measurement end point is performed. Therefore, the sampling of the optical power signal may be performed at a timing when the pulsed light is off, and the spectrum of the pulsed light cannot be measured stably.

On the other hand, the optical spectrum analyzer 1 of the present embodiment uses, as the optical power signal of the next wavelength, the average value of the optical power signals sampled a plurality of times while moving from the previous wavelength to the next wavelength. The optical power signals sampled a plurality of times are likely to include an optical power signal sampled at a peak timing. Therefore, the peak of the optical power signal can be sampled without a configuration in which the period of the pulsed light is synchronized with the sampling period of the A/D conversion unit, and the spectrum of the pulsed light can be stably measured. As a result, it is possible to suppress the decrease in the sweep speed.

Figure 6:
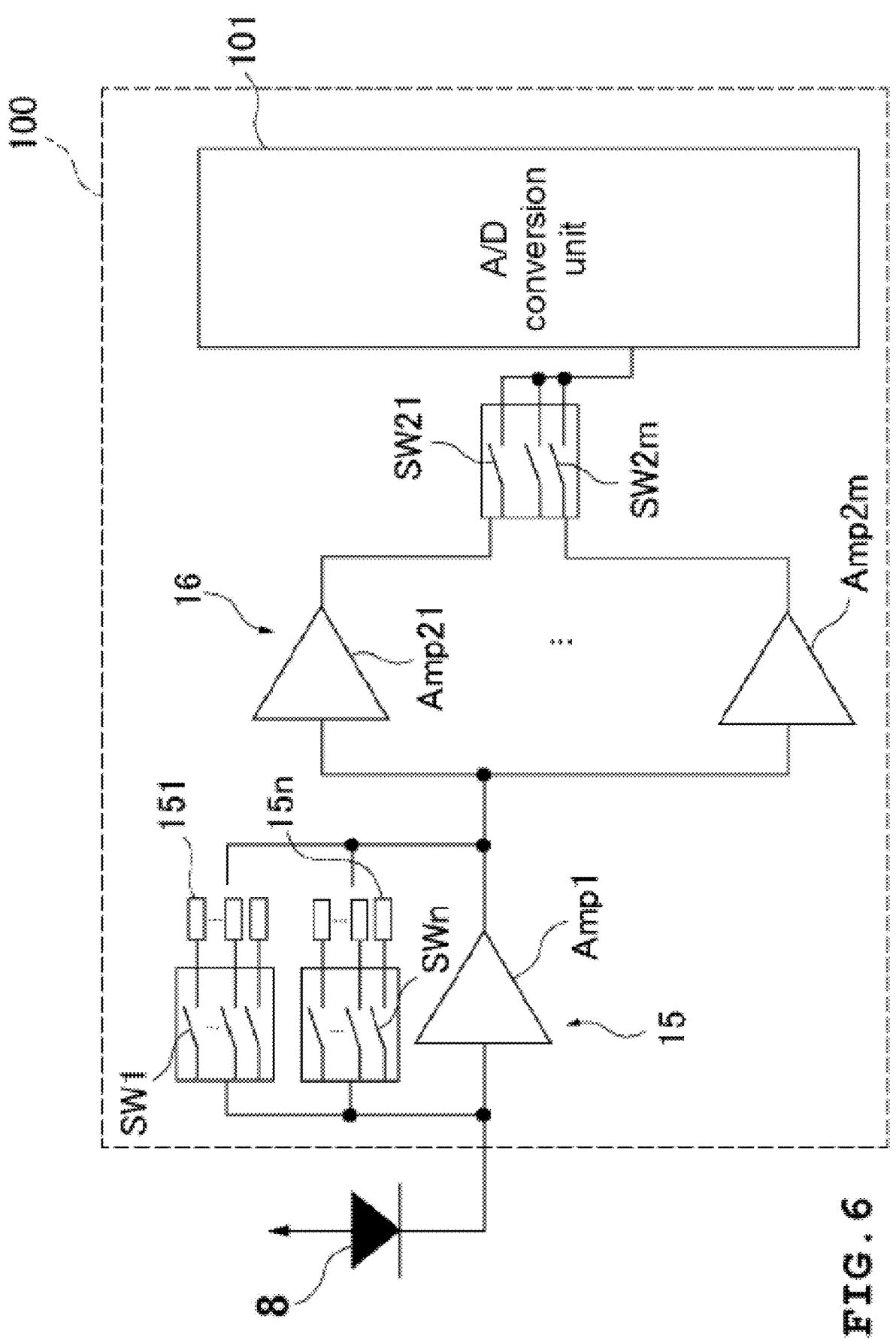
FIG. 6 is a circuit diagram showing an example of a measurement unit of an optical spectrum analyzer in a comparative example.

Moreover, the optical spectrum analyzer 1 of the present embodiment has a configuration in which the A/D conversion unit 17 has a plurality of inputs and the outputs of the plurality of amplifiers Amp21 to Amp2m can be input thereto. The effects of this configuration will be described with reference to FIGS. 6 and 7. FIG. 6 shows an example of a measurement unit 100 of an optical spectrum analyzer as a comparative example. In FIG. 6, the same parts as those in FIG. 2 are denoted by the same reference numerals, and detailed description thereof will be omitted.

In the optical spectrum analyzer of the comparative example, an A/D conversion unit 101 has only one input, and can perform A/D conversion only on one output selected by switches SW21 to SW2m among outputs of the amplifiers Amp21 to Amp2m. Therefore, in the optical spectrum ana-

Figure 7:
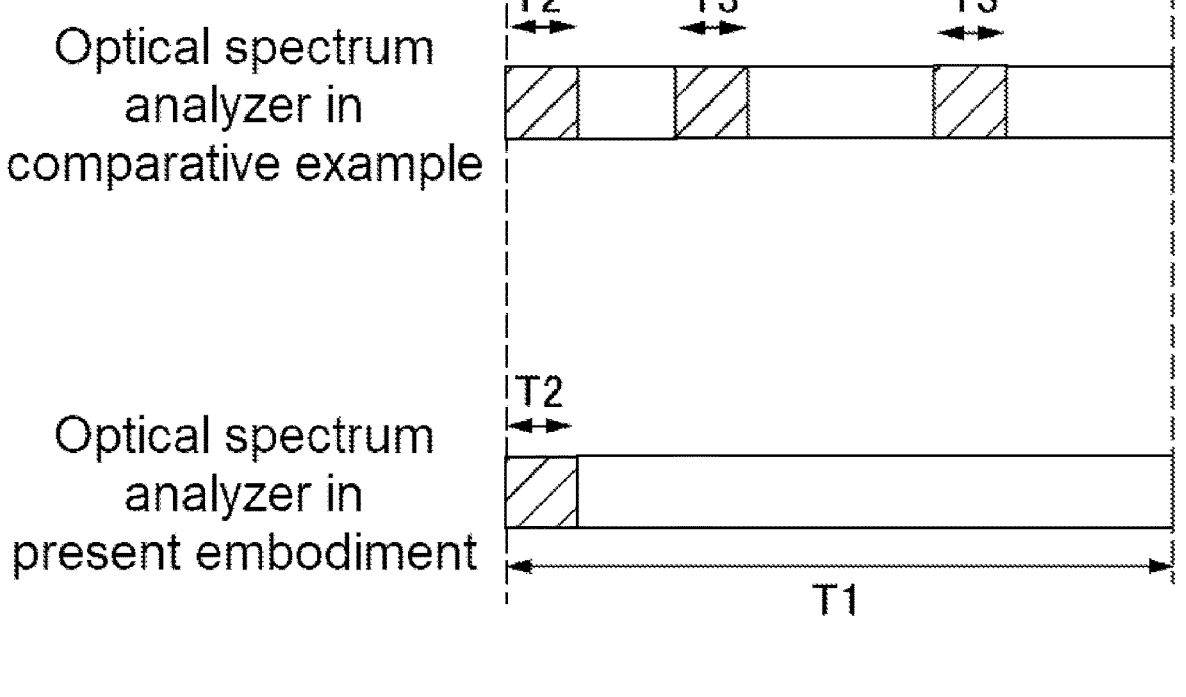
FIG. 7 is a time chart showing a continuous sampling available period and a continuous sampling unavailable period of the optical spectrum analyzer of the present embodiment shown in FIG. 1 and the optical spectrum analyzer of the comparative example shown in FIG. 6.

7 lyzer of the comparative example, as shown in FIG. 7, the switches SW1 to SW1$n$ and SW21 to SW2$n$ are first switched at a measurement interval T1 from the previous wavelength to the next wavelength to set the VBW and select the amplifiers Amp21 to Amp2$m$. During the period in which the switches SW1 to SW1$n$ and SW21 to SW2$n$ are switched, there is a continuous sampling unavailable period T2 in which continuous sampling cannot be performed.

After the continuous sampling unavailable period T2 has elapsed, the A/D conversion unit 101 starts sampling. Thereafter, when the maximum value (saturation value) is included in the sampled digital values, it is necessary to switch the switches SW21 to SW2$n$ again to change the selected amplifiers Amp21 to Amp2$m$. During the period in which the switches SW21 to SW2$n$ are switched, there is a continuous sampling unavailable period T3 in which continuous sampling cannot be performed. Therefore, the amplifiers Amp21 to Amp2$m$ are sequentially selected, and the continuous sampling unavailable period T3 occurs intermittently until the amplifiers Amp21 to Amp2$m$ whose output is not saturated are selected.

In the optical spectrum analyzer of the comparative example, as shown in FIG. 5, there is a concern that the timing at which the optical power signal reaches a peak overlaps the continuous sampling unavailable period T3, so that the peak of the optical power signal cannot be captured and the spectrum of the pulsed light cannot be stably measured.

On the other hand, the optical spectrum analyzer 1 of the present embodiment selects the amplifiers Amp21 to Amp2$m$ on the software. Therefore, as shown in FIG. 7, the optical spectrum analyzer 1 of the present embodiment requires the continuous sampling unavailable period T2 for setting the VBW, but can eliminate the continuous sampling unavailable period T3 for switching the amplifiers Amp21 to Amp2$m$, so that the continuous sampling available period can be made longer than in the comparative example. Therefore, the optical spectrum analyzer 1 of the present embodiment can sample the peak of the optical power signal and can stably measure the spectrum of the pulsed light.

In addition, the optical spectrum analyzer 1 of the present embodiment samples the optical power signal at a sampling period shorter than the period of the pulsed light. Therefore, it is possible to further increase the possibility of performing sampling at the peak timing of the optical power signal.

The present invention is not limited to the above-described embodiment, and can be appropriately modified, improved, and the like. In addition, the material, shape, dimensions, number, arrangement location, and the like of each component in the above-described embodiment have any values as long as the present invention can be achieved, and are not limited.

In the above-described embodiment, the control unit 12 performs the filter processing during the wavelength sweeping, but the present invention is not limited thereto. The filter processing may be performed after the wavelength sweeping is completed.

In the above-described embodiment, the control unit 12 uses the average value of the continuously sampled optical power signals as the optical power signal of the next wavelength while sweeping from the previous wavelength to the next wavelength is performed, but the present invention is not limited thereto. A peak value may be used as the optical power signal of the next wavelength instead of the average value. In addition, the average value of the continuously sampled optical power signals may be used as the optical power signal of the previous wavelength while sweeping from the previous wavelength to the next wavelength is performed.

Here, the features of the embodiment of the optical spectrum analyzer according to the present invention described above are briefly summarized and listed below in [1] and [2].

[1]

An optical spectrum analyzer (1) including: a spectral section (4) that emits diffracted light obtained by spectrally separating a wavelength included in pulsed light to be measured in a direction corresponding to the wavelength; a light receiving section (8) that receives the diffracted light emitted from the spectral section (4) and converts the diffracted light into an electric signal; a sweep section (9) that causes the light receiving section (8) to receive the diffracted light swept in a wavelength; an amplification unit (16) that amplifies the electric signal converted by the light receiving section (8) and outputs the amplified electric signal as an optical power signal; an A/D conversion unit (17) that performs A/D conversion of the optical power signal output by the amplification unit (16); and a control unit (12) that obtains optical power for each wavelength included in the pulsed light based on the optical power signal sampled and converted into a digital value by the A/D conversion unit (17) during wavelength sweeping, in which the amplification unit (16) has a plurality of amplifiers (Amp21 to Amp2$m$) having gains different from each other, the A/D conversion unit (17) has a plurality of A/D converters to which outputs of the plurality of amplifiers (Amp21 to Amp2$m$) are respectively connected, and the control unit (12) selects one of the amplifiers (Amp21 to Amp2$m$) whose output is not saturated based on the optical power signals amplified by the plurality of amplifiers (Amp21 to Amp2$m$) and converted into the digital values by the plurality of A/D converters, and obtains the optical power based on the digital value of the optical power signal sampled by the A/D conversion unit (17) and output from the selected one of the amplifiers (Amp21 to Amp2$m$).

[2]

The optical spectrum analyzer according to [1], in which the A/D conversion unit (17) samples the optical power signal in a sampling time shorter than a period of the pulsed light.

DESCRIPTION OF REFERENCE NUMERALS AND SIGNS

1 Optical spectrum analyzer
4 Diffraction grating (spectral section)
8 Light receiving section
9 Motor (sweep section)
12 Control unit (amplifier selection unit)
16 Amplification unit
17 A/D conversion unit
Amp21 to Amp2$m$ Amplifier

What is claimed is:
1. An optical spectrum analyzer comprising:
a spectral section that emits diffracted light obtained by spectrally separating a wavelength included in pulsed light to be measured in a direction corresponding to the wavelength;
a light receiving section that receives the diffracted light emitted from the spectral section and converts the diffracted light into an electric signal;
a sweep section that causes the light receiving section to receive the diffracted light swept in a wavelength;

an amplification unit that amplifies the electric signal converted by the light receiving section and outputs the amplified electric signal as an optical power signal;

an A/D conversion unit that performs A/D conversion of the optical power signal output by the amplification unit; and a control unit that obtains optical power for each wavelength included in the pulsed light based on the optical power signal sampled and converted into a digital value by the A/D conversion unit during wavelength sweeping, wherein the amplification unit has a plurality of amplifiers having gains different from each other, the A/D conversion unit has a plurality of A/D converters to which outputs of the plurality of amplifiers are respectively connected, and the control unit selects one of the amplifiers whose output is not saturated based on the optical power signals amplified by the plurality of amplifiers and converted into the digital values by the plurality of A/D converters, and obtains the optical power based on the digital value of the optical power signal sampled by the A/D conversion unit and output from the selected one of the amplifiers.

2. The optical spectrum analyzer according to claim 1, wherein the A/D conversion unit samples the optical power signal in a sampling time shorter than a period of the pulsed light.

\* \* \* \* \*